Nov. 9, 1948.    R. C. SCOTT    2,453,273
TIRE ANTISKID MECHANISM
Filed Oct. 9, 1946    2 Sheets—Sheet 1
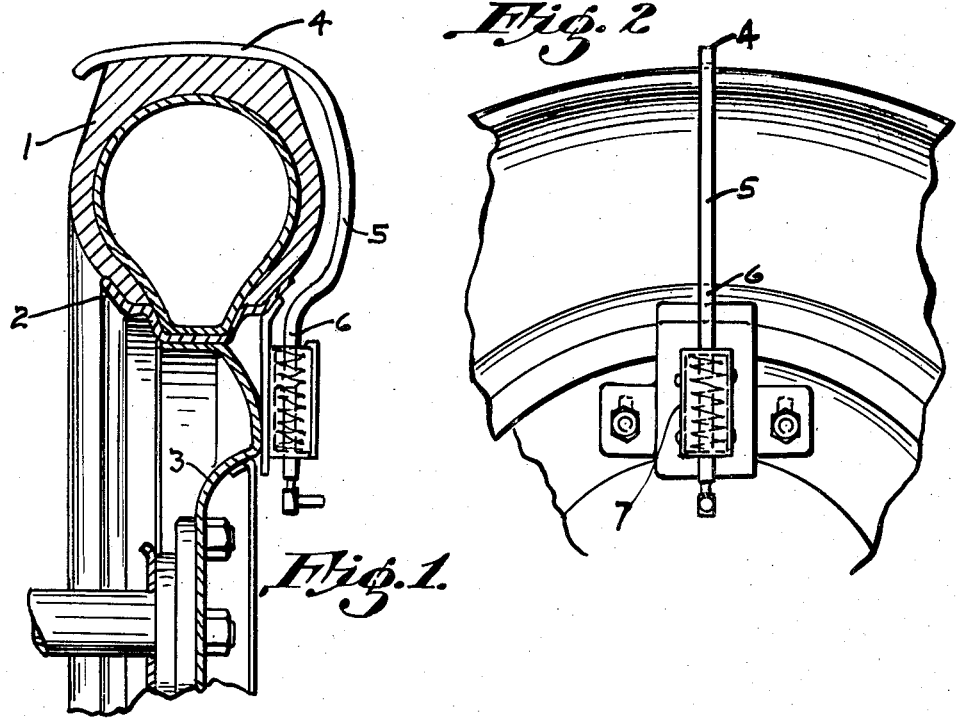
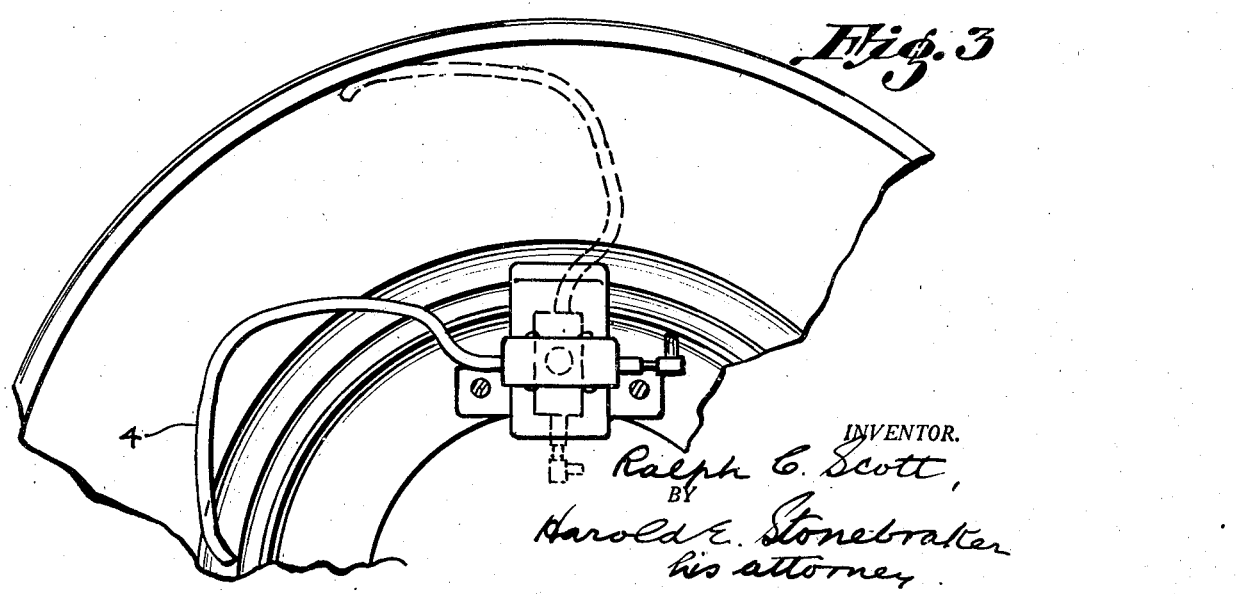
INVENTOR.
Ralph C. Scott,
BY Harold E. Stonebraker
his attorney.

Nov. 9, 1948.   R. C. SCOTT   2,453,273
TIRE ANTISKID MECHANISM
Filed Oct. 9, 1946   2 Sheets-Sheet 2

INVENTOR.
Ralph C. Scott,
BY Harold E. Stonebraker
his attorney.

Patented Nov. 9, 1948

2,453,273

UNITED STATES PATENT OFFICE 2,453,273

TIRE ANTISKID MECHANISM

Ralph C. Scott, Brighton, N. Y.

Application October 9, 1946, Serial No. 702,193

6 Claims. (Cl. 152—216)

This invention relates to a tire anti-skid device, and has for its purpose to afford a structure that can be attached to a wheel body or disk and includes an anti-skid element that is quickly adjustable to operative position in contact with and across the tire, or movable to an inoperative position out of engagement with the tire when not required, thus avoiding the necessity of using chains, hooks, or similar devices which remain in ground-engaging position and impose wear on the tire at all times during attachment.

More particularly, the invention has for its purpose to afford a simple, practical, and economical construction that can be readily secured to a wheel body and embodies an anti-skid element that is positionable either across the tire in contact with its periphery, or at one side of the wheel out of engagement with the tire and ground, the anti-skid element being shiftable to either position by a quick and easy manipulation which permits it to be arranged at one side of the tire when not in use and to be instantly adjusted in contact with the tire periphery when conditions require skid-preventing action.

Another object of the invention is to afford a mechanism having few movable parts and including a support or bracket attachable readily to a wheel, a housing supported on the bracket for rotative movement through an angle of ninety degrees and positionable either horizontally or vertically, and an anti-skid bar of angular cross-section supported by the housing and movable both endwise and rotatably in relation thereto to permit the required adjustments of the anti-skid bar to operative or inoperative positions.

A further purpose of the invention is to afford a construction including an adjustable anti-skid element in the form of a rigid bar positionable across the tread of a tire for engagement with the ground, and arranged so as to have sufficient yielding action to accommodate itself to the tire as the latter is compressed and to protect the tire effectively against skidding without excessive wear of the tire or anti-skid element.

To these and other ends, the invention consists in the construction and arrangement of parts that will appear clearly from the following description when read in conjunction with the accompanying drawings, the novel features being pointed out in the claims following the specification.

In the drawings:

Fig. 1 is a transverse sectional view through a tire and wheel, showing the application of a preferred embodiment of the invention, with the anti-skid element in operative position across the tire;

Fig. 2 is a side elevation of the same;

Fig. 3 is a side elevation similar to Fig. 2, showing in dotted lines the position of the parts after the anti-skid bar has been shifted to one side of the tire and before turning the housing to horizontal position, and the final inoperative position of the parts appearing in full lines;

Figure 4:
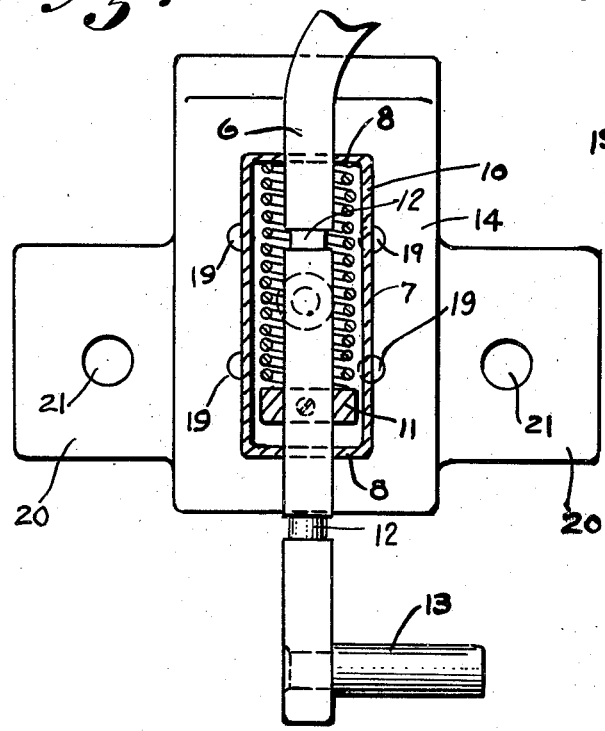
Fig. 4 is an enlarged side elevation, with the housing in vertical section, showing the parts in the position illustrated in dotted lines in Fig. 3.

Referring more particularly to the drawings in which like reference numerals refer to the same parts throughout the several views, I designates a conventional form of pneumatic tire mounted on the usual rim 2 which is fastened to or forms part of the wheel body or disk 3, these parts being only for illustrative purposes and forming no part of the invention, which is carried by the wheel body or disk 3, preferably in the manner now to be described.

The invention includes an anti-skid element in the form of a bar 4 of angular and preferably square cross-section, as appears in Fig. 2, that is positionable either across the tire in contact with its tread, as illustrated in Figs. 1 and 2, or at one side of the tire and wheel, as shown in full lines in Fig. 3. The anti-skid element or bar 4 includes a curved connecting portion 5 and a supporting portion 6, the latter being mounted for rotative and endwise movement within a housing 7.

Figure 6:
Fig. 6 is a cross-sectional view of the supporting portion of the anti-skid element or bar.

The housing 7 includes end walls 8 having openings therein through which the supporting portion 6 extends, the latter having a square cross-section as shown in Fig. 6, while the openings 9 in the end walls of the housing are similarly squared to normally prevent turning of the supporting portion 6 within the housing. The anti-skid bar is held in adjusted position within the housing by means of a spring 10 surrounding the supporting portion 6 and engaging the housing at one end and a ring 11 at its other end, the ring 11 being fixed on the supporting portion 6.

The supporting portion 6 is provided with annular cut-away portions or grooves 12 which, when the supporting portion 6 is elevated, are alined with the end walls 8 of the housing 7 and thus permit turning of the supporting portion 6 and anti-skid bar within the housing 7. 13 designates a finger portion or handle secured to the lower end of the supporting portion 6 for elevating the latter against the tension of spring 10 when it is desired to turn the supporting portion 6 within the housing.

The housing 7 is pivotally mounted on a mounting or bracket 14 by means of a bolt 15 extending through the mounting 14 and the adjacent wall of the housing and held in place by means of a nut 16. A leaf spring 17 surrounds the bolt 15 and extends endwise of the inner surface of the adjacent wall of the housing under the head 18 of the bolt, and acts to hold the housing with a slight yielding action against the mounting 14. The bracket 14 is provided with four bosses 19, preferably stamped from the mounting 14, and arranged to engage with the adjacent edges of the side walls of the housing so as to hold the latter in either of its adjusted positions, while the spring 17 permits the necessary outward movement of the housing away from the mounting 14, to shift the housing readily from its vertical position, as shown in Figs. 1, 2 and 4, to its horizontal position, as illustrated in Fig. 3.

Figure 7:
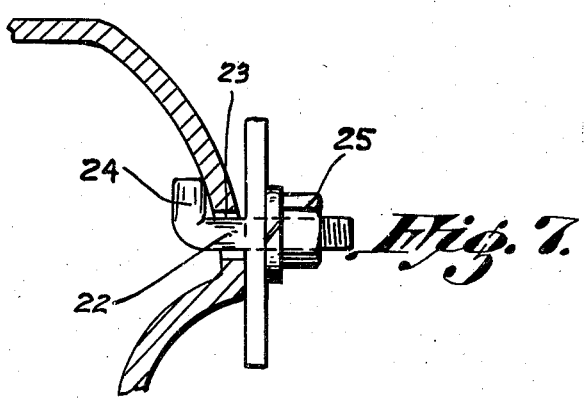
Fig. 7 is an enlarged detail sectional view showing the attaching means for securing the device on a wheel body.

The mounting or bracket 14 is provided with lateral extensions 20 having openings 21 therein, while 22 designate bolts engageable through the openings 21 in the mounting 14 and through suitable openings 23 in the wheel body or disk 3, and provided with lateral extensions 24 on their inner ends engaging the inner face of the wheel disk 3 while the mounting 14 is held in place by means of nuts 25 engaging the outer ends of the bolts 22, see Fig. 7. 26 designates a removable cover that may be suitably fastened over the housing 7 to conceal and protect the parts therein from dust and dirt. The mounting 14 may be secured in other ways to the wheel disk or body, or the housing may be permanently attached to the wheel or constructed as a part thereof if desired.

Figure 5:
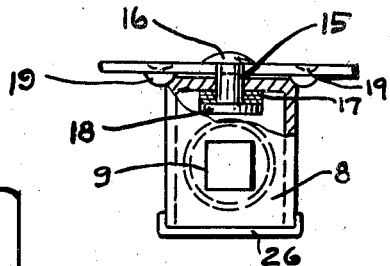
Fig. 5 is a horizontal sectional view taken centrally of the housing.

In the operation of the device, the anti-skid bar 4 when out of operation lies in the position illustrated in full lines in Fig. 3 at one side of the tire and wheel, and is held against vibration or movement within the housing by means of the spring 10, while the housing is held against movement or vibration on the support by means of the spring 17. When it is desired to use the anti-skid bar and position it crosswise of the tire tread, the housing 7 is first swung from the full line position of Fig. 3 to vertical position as shown in dotted lines by applying sufficient force to overcome the resistance of the spring 17, which holds the housing in either position against the bosses 19. After the housing has moved over the tops of the bosses 19, it snaps into vertical position between the bosses 19 and is there held by the spring 17, as illustrated in Figs. 4 and 5, also in dotted lines in Fig. 3. Then by engaging handle 13, the supporting portion 6 of the anti-skid bar 4 is pulled upwardly against the tension of spring 10 until the annular grooves 12 are in alinement with the end walls 8, whereupon the supporting portion 6 can be turned through an angle of ninety degrees until the anti-skid bar 4 is crosswise of the tire. Then upon releasing handle 13 and anti-skid bar 4, the spring 10 pulls it toward the tread of the tire until it assumes the position shown in Fig. 1.

It will be understood that there may be more than one anti-skid unit fastened around the wheel at selected points, so as to afford any number of anti-skid bars, each of which is positioned for operative control in the manner just described. The anti-skid bar 4 lying transversely across the tire tread follows the movements of the tire as the latter is compressed by the weight of the vehicle, since the bar 4 and its supporting portion 6 can move inwardly or endwise of the housing 7, and the housing 7 can, if necessary, swing about its pivot 15 to permit the bar to follow closely the movements of the tire. When the roadway is free of ice and snow and action of the anti-skid bar is no longer required, the latter can be quickly moved to inoperative position by first pulling the bar 4 outwardly away from the tire tread and against the tension of spring 10 until the annular grooves 12 are alined with the end walls 8 of the housing, then rotating the supporting portion 6 and anti-skid bar through an angle of ninety degrees and releasing the anti-skid bar to the position shown in dotted lines in Fig. 3, after which the housing is turned to horizontal position to bring the parts to the location illustrated in Fig. 3 in full lines.

With this mechanism, the driver of a car can easily position the anti-skid bars for operation on slippery or icy pavements, and when there is no further need and it is desirable to have the tires in direct contact with the pavement without the intervention of the anti-skid bars, the latter can be easily moved out of operative position, without requiring the services of a garage mechanic or extensive adjustments, as the entire operation on several single anti-skid bars can be performed in a few minutes.

While the invention has been described with reference to the particular construction herein illustrated, it is not confined to the details shown, and this application is intended to cover such modifications and changes as may come within the purposes of the improvement and the scope of the following claims.

I claim:

1. A tire anti-skid mechanism comprising an anti-skid bar positionable crosswise of a tire tread in contact therewith, said bar including a curved connecting portion and a supporting portion, a housing within which the supporting portion is endwise movable and rotatable, spring means controlling the supporting portion and acting to draw the anti-skid bar toward the tire tread, the supporting portion having a rectangular cross-section and the housing having end walls with rectangular openings to receive said rectangular supporting portion, the supporting portion being held against rotation in the housing when in operative and inoperative positions and provided with annular channels which are registrab'e with the end walls of the housing when the supporting portion is drawn outwardly and thereby permitting turning of the supporting portion within the housing.

2. A tire anti-skid mechanism comprising a mounting, a housing pivotally arranged on the mounting for rotative adjustment in a vertical plane, an anti-skid bar including a supporting portion extending through said housing, said anti-skid bar and supporting portion lying in a plane with the pivotal axis of said housing when in operative position, and spring means within the housing connected to the supporting portion and acting to draw the anti-skid bar inwardly, said supporting portion having a rectangular cross-section and the housing having end walls with rectangular openings to receive said rectangular supporting portion, the supporting portion being held against rotation in the housing when in operative and inoperative positions and provided with annular channels which are registrable with the end walls of the housing when the supporting portion is drawn outwardly and thereby permitting turning of the supporting portion within the housing.

3. A tire anti-skid mechanism comprising a mounting, a housing pivotally arranged on the mounting for rotative movement in a vertical plane, an anti-skid bar including a supporting portion extending through said housing, said anti-skid bar and supporting portion being located in a plane with the pivotal axis of said housing when in operative position, spring means within the housing connected to the supporting portion and acting to draw the anti-skid bar inwardly, said supporting portion having a rectangular cross-section and the housing having end walls with rectangular openings to receive said rectangular supporting portion, the supporting portion being held against rotation in the housing when in operative and inoperative positions and provided with annular channels which are registrable with the end walls of the housing when the supporting portion is drawn outwardly and thereby permitting turning of the supporting portion within the housing, retaining bosses on the mounting, and yieldable means connected to the housing and acting to hold the latter against said retaining bosses in either vertical or horizontal position.

4. A tire anti-skid mechanism comprising a mounting, a housing pivotally arranged on the mounting and having swinging movement in opposite directions from a vertical position, spring means engaging the housing and retaining it yieldably in vertical position, an anti-skid bar including a supporting portion having rotative and bodily endwise movements in said housing, and spring means engaging the supporting portion and acting to hold it in its innermost position in the housing, said anti-skid bar and supporting portion when in operative position lying in the same plane with the pivotal axis on which the housing swings.

5. A tire anti-skid mechanism comprising a mounting, a housing pivotally arranged on the mounting and having swinging movement in opposite directions from a vertical position, spring means engaging the housing and retaining it yieldably in vertical position, the housing including an end wall with an angular opening therein, an anti-skid bar including a supporting portion having an angular locking portion extending through said opening in the housing and movable endwise of the housing, the supporting portion having an annular groove below said locking portion and registering with said angular opening to permit turning the supporting portion when in its outermost position, the supporting portion being held against turning in all positions except said outermost position, and spring means engaging the supporting portion and acting to move it inwardly of the housing, said anti-skid bar and supporting portion when in operative position lying in the same plane with the pivotal axis on which the housing swings.

6. A tire anti-skid mechanism comprising a mounting, a housing pivotally arranged on the mounting and having swinging movement in opposite directions from a vertical position, spring means engaging the housing and retaining it yieldably in vertical position, an anti-skid bar including a tire tread-engaging portion, a curved connecting portion, and a supporting portion having movement endwise of the housing and rotative movement within the housing when in its outermost position, and spring means engaging said supporting portion and acting to move it inwardly of the housing, the anti-skid bar and supporting portion when in operative position lying in the same plane with the pivotal axis on which the housing swings.

RALPH C. SCOTT.

REFERENCES CITED

The following references are of record in the file of this patent:

UNITED STATES PATENTS

| Number | Name | Date |
|---|---|---|
| 1,257,145 | Stern | Feb. 19, 1918 |

FOREIGN PATENTS

| Number | Country | Date |
|---|---|---|
| 187,567 | Switzerland | Mar. 16, 1937 |